US006888543B2

(12) United States Patent
Ingber et al.

(10) Patent No.: US 6,888,543 B2
(45) Date of Patent: May 3, 2005

(54) METHOD AND APPARATUS FOR DISPLAYING INFORMATION

(75) Inventors: Donald E. Ingber, Boston, MA (US); Sui Huang, Boston, MA (US); Gabriel Eichler, Cambridge, MA (US)

(73) Assignee: Children's Medical Center Corporation, Boston, MA (US)

( * ) Notice: Subject to any disclaimer, the term of this patent is extended or adjusted under 35 U.S.C. 154(b) by 158 days.

(21) Appl. No.: 10/435,660

(22) Filed: May 9, 2003

(65) Prior Publication Data

US 2004/0179012 A1 Sep. 16, 2004

Related U.S. Application Data

(60) Provisional application No. 60/452,857, filed on Mar. 7, 2003.

(51) Int. Cl.[7] ................................................. G06T 17/00
(52) U.S. Cl. ......................... 345/420; 345/782; 345/788
(58) Field of Search ................................ 345/420, 619, 345/631, 635, 781, 782, 783, 788, 400–433

(56) References Cited

U.S. PATENT DOCUMENTS 6,057,842 A * 5/2000 Knowlton et al. ........... 345/788

2003/0030637 A1 * 2/2003 Grinstein et al. ............ 345/420
2003/0043200 A1 * 3/2003 Faieta et al. ................. 345/804

* cited by examiner

Primary Examiner—Matthew Luu
(74) Attorney, Agent, or Firm—Kirkpatrick & Lockhart Nicholson Graham LLP

(57) ABSTRACT

A method for displaying large amounts of information. The method includes the steps of forming a spatial layout of tiles each corresponding to a representative reference element; mapping observed elements onto the spatial layout of tiles of representative reference elements; assigning a respective value to each respective tile of the spatial layout of the representative elements; and displaying an image of the spatial layout of tiles of representative elements. Each tile includes atomic attributes of representative elements. The invention also relates to an apparatus for displaying large amounts of information. The apparatus includes a tiler forming a spatial layout of tiles, each corresponding to a representative reference element; a comparator mapping observed elements onto said spatial layout of tiles of representative reference elements; an assigner assigning a respective value to each respective tile of said spatial layout of representative reference elements; and a display displaying an image of the spatial layout of tiles of representative reference elements.

37 Claims, 10 Drawing Sheets

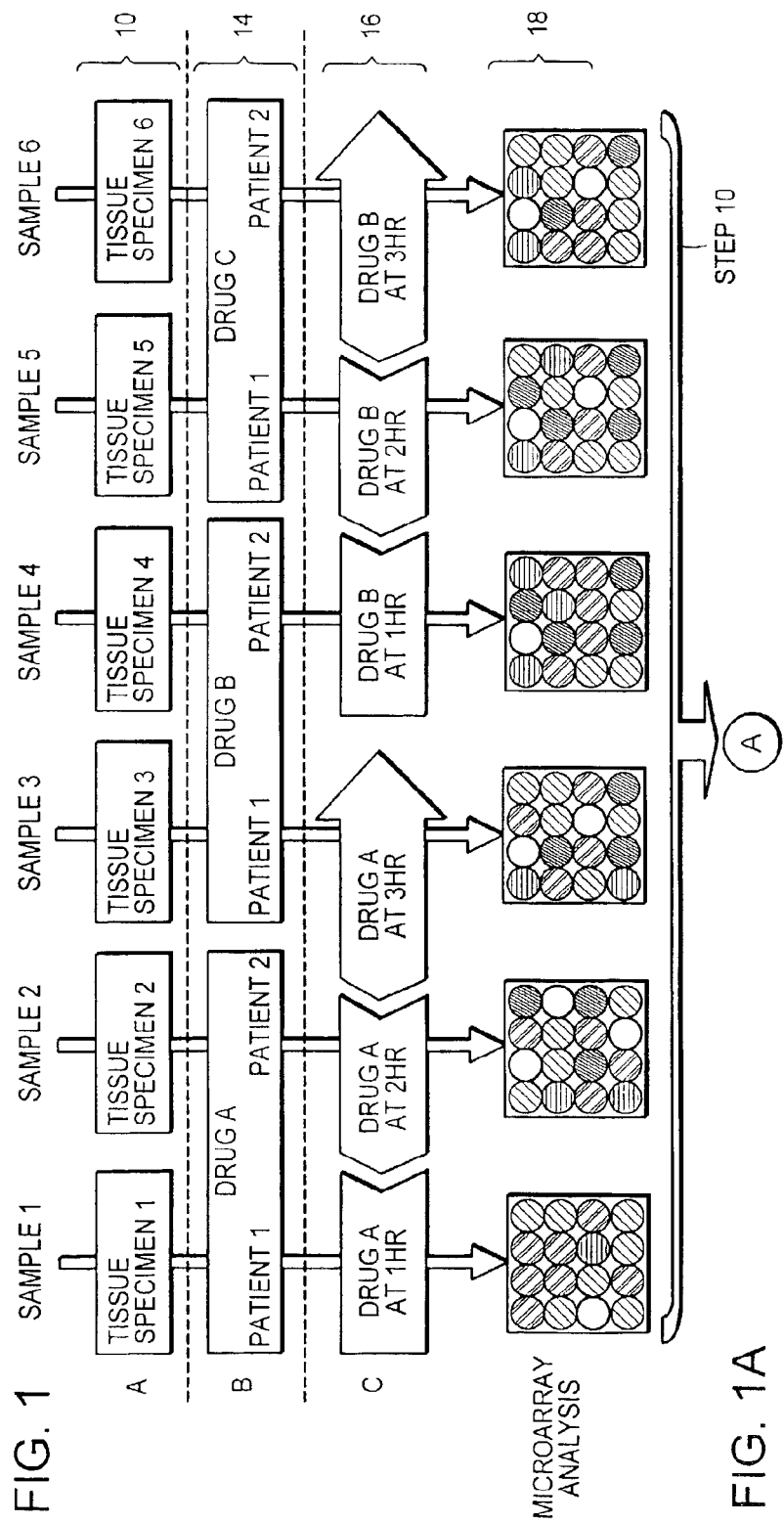

Normal Tissue vs. Tumor

Prostate Cancer

METHOD AND APPARATUS FOR DISPLAYING INFORMATION

RELATED APPLICATIONS

The application claims priority to U.S. Provisional application 60/452,857 filed Mar. 7, 2003 and assigned to the assignee of the instant application. The provisional application is hereby incorporated by reference herein. This application incorporates by reference U.S. utility application Ser. No. 09/985,963 filed Oct. 19, 2001 which claims priority to provisional application 60/242,009 filed Oct. 20, 2000 both of which assigned to the assignee of the instant invention. Both utility application Ser. No. 09/985,963 and provisional application 60/242,009 are herein incorporated by reference.

FIELD OF THE INVENTION

The invention relates generally to the field of informatics and more specifically to the field of informatic displays.

BACKGROUND OF THE INVENTION

The behavior of a large number of interacting elements in a system is difficult to display, analyze and interpret. Many techniques have been attempted to derive an ordered model from the elements in such a system. An example of a system which produces such a large amount of data is the genome. Not only may the genome consist of a large number of genes (numbering in the tens of thousands for the human) but many genes of an organism interact. For example many genes exert control over other genes. That is many genes either induce or raise the expression level of other genes or inhibit or decrease the expression level of other genes. The act of just displaying the genes of a genome and their interactions, never mind analyzing such a large amount of data, is daunting. Since the genes exert control on each other, they do not change their expression levels independently, but instead form a genome-wide network of interactions. Similarly, proteins and metabolites and other cell constituents are part of a network of interactions. The consequence of this mutual control between different genes or molecules is that the dynamics of the molecular profiles are constrained to certain coherent, recurring patterns.

Self Organizing Maps or SOMs have been used in an attempt to group genes according to their expression activity versus time profile. Under this technique, genes having similar expression behavior are grouped together into clusters on a matrix of behaviors. The output of this algorithm is essentially just the information about individual genes with regard to their assignment to one of these clusters. However, displaying these genes as a matrix of expression behaviors provides a complicated array of graphs that does not help significantly with the analysis of the interactive gene behavior or with the interpretation of coherent patterns that emerge in the displayed expression profiles.

Similarly, other currently used analysis techniques for gene profiling, such as in hierarchical clustering, k-means clustering or principal component analysis, group genes into a small number of clusters relative to the total number of genes, and also fail to visualize patterns within the overall gene profile.

In order to study the recurring patterns within genome-wide expression or molecular profiles, it is necessary to monitor the change of entire profiles at different times during a sequential process, or in response to multiple variables, such as during the longitudinal monitoring of multiple patients or of the biological responses of cells or tissues following treatment with various drugs. Such comparative time course analysis will generate data volumes comprised of three dimensions: (i) the elements of the molecular profile (e.g., the genes in gene expression profiles); (ii) the time points at which the profile is measured and (iii) the time course for each of the various processes studied. Existing gene clustering techniques are generally not capable of simultaneously monitoring multiple dimensions, and hence a new method is required to visualize these global time-dependent changes in gene expression profiles.

The present invention provides a method and apparatus to not only group genes according to activity but also to display the activity in such a way that reveals characteristic patterns in the monitored profiles, hence visualizing the underlying relationship between the genes that comprise the regulatory network. It also provides a method to display the information of all three dimensions—gene, time and process—simultaneously.

SUMMARY OF THE INVENTION

The invention relates to a method for displaying large amounts of information. The method includes the steps of forming a spatial layout of tiles each corresponding to a representative element; matching observed elements onto the spatial layout of tiles of representative elements; assigning a respective value to each respective tile of said spatial layout of representative elements; and displaying an image of the spatial layout of tiles of representative elements. Each tile includes atomic attributes of the representative elements.

In one embodiment the step of forming a spatial layout of tiles includes the step of forming a self-organizing map. In another embodiment steps of forming a self organizing map include the steps of forming representative reference elements, selecting a best unit matching centroid and adjusting the best unit matching centroid to form an adjusted best unit matching centroid. In still yet another embodiment the step of matching an observed element to a representative reference element includes the step of measuring the Euclidean distance between the observed element and each representative reference element, and selecting the representative reference element having the least distance.

The invention also relates to a method of displaying information. The method includes the steps of normalizing the data of observed elements; generating reference centroids, generating a map of the reference centroids; matching an observed element to a respective reference centroid and adjusting the respective reference centroid and the neighboring reference centroids. The method also includes the steps of iterating the above steps, modifying the strength of adjustment and the neighborhood radius to form a plurality of adjusted reference centroids, and matching each observed element to a respective adjusted reference centroid. The method also includes the steps of assigning a respective value for each sample, assigning a respective graphic representation to each respective value and displaying a mosaic for each sample. In another embodiment the step of displaying is repeated to form a motion graphic. In yet another representation the respective graphic is 3-D representation.

The invention also relates to an apparatus for displaying large amounts of information. In one embodiment, the apparatus includes a tiler forming a spatial layout of tiles each corresponding to a representative element; a matcher matching observed elements onto said spatial layout of tiles of representative elements; an assigner assigning a respective value to each respective tile of said spatial layout of representative elements; and a display displaying an image of the spatial layout of tiles of representative elements. Each tile includes atomic attributes of the representative elements.

In one embodiment the tiler includes a self-organizing map processor. In another embodiment the assigner assigns a color to each respective tile. In yet another embodiment the display is a 3-D display.

The invention also relates to an apparatus for displaying data. In one embodiment the apparatus includes a normalizer normalizing the data of observed elements, a reference centroid generator generating a plurality of reference centroids and a map of the reference centroids and a comparator matching an observed element to a respective reference centroid. In another embodiment a processor iteratively adjusts the respective reference centroid and neighboring reference centroids to form a plurality of adjusted reference centroids. The embodiment also includes a matcher matching an observed element to a respective adjusted reference centroid, a value assignor which assigns a respective value to each sample and a graphics engine assigning a graphic representation to each respective value and displaying a mosaic for each sample.

BRIEF DESCRIPTION OF THE DRAWINGS

These and other features of the invention will be better understood by reference to the attached specification and drawings of which.

DESCRIPTION OF THE PREFERRED EMBODIMENT

Figure 1B:
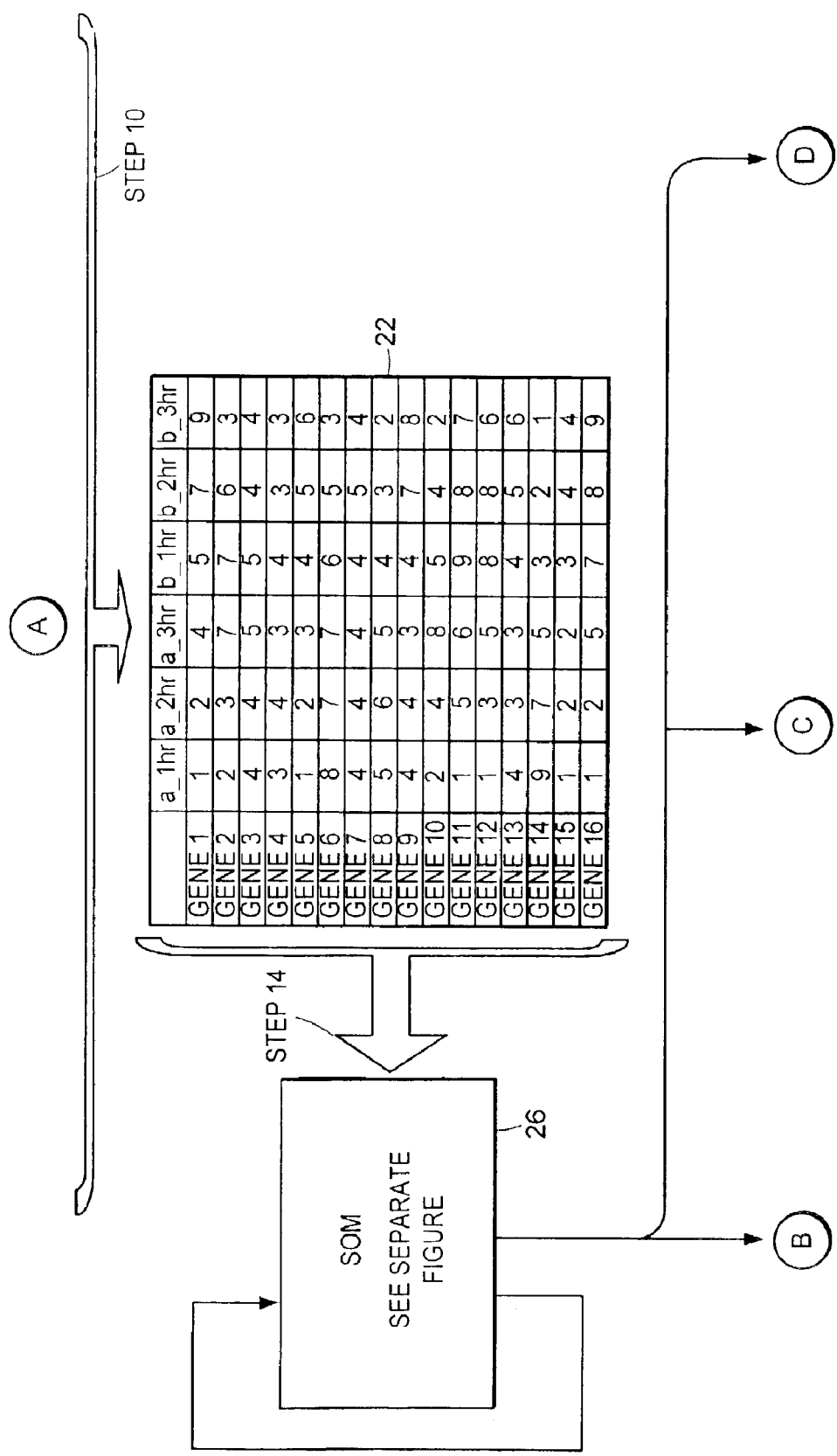
FIG. 1 is a graphic representation of an embodiment of the method of the invention used display gene activation.
Figure 1C:
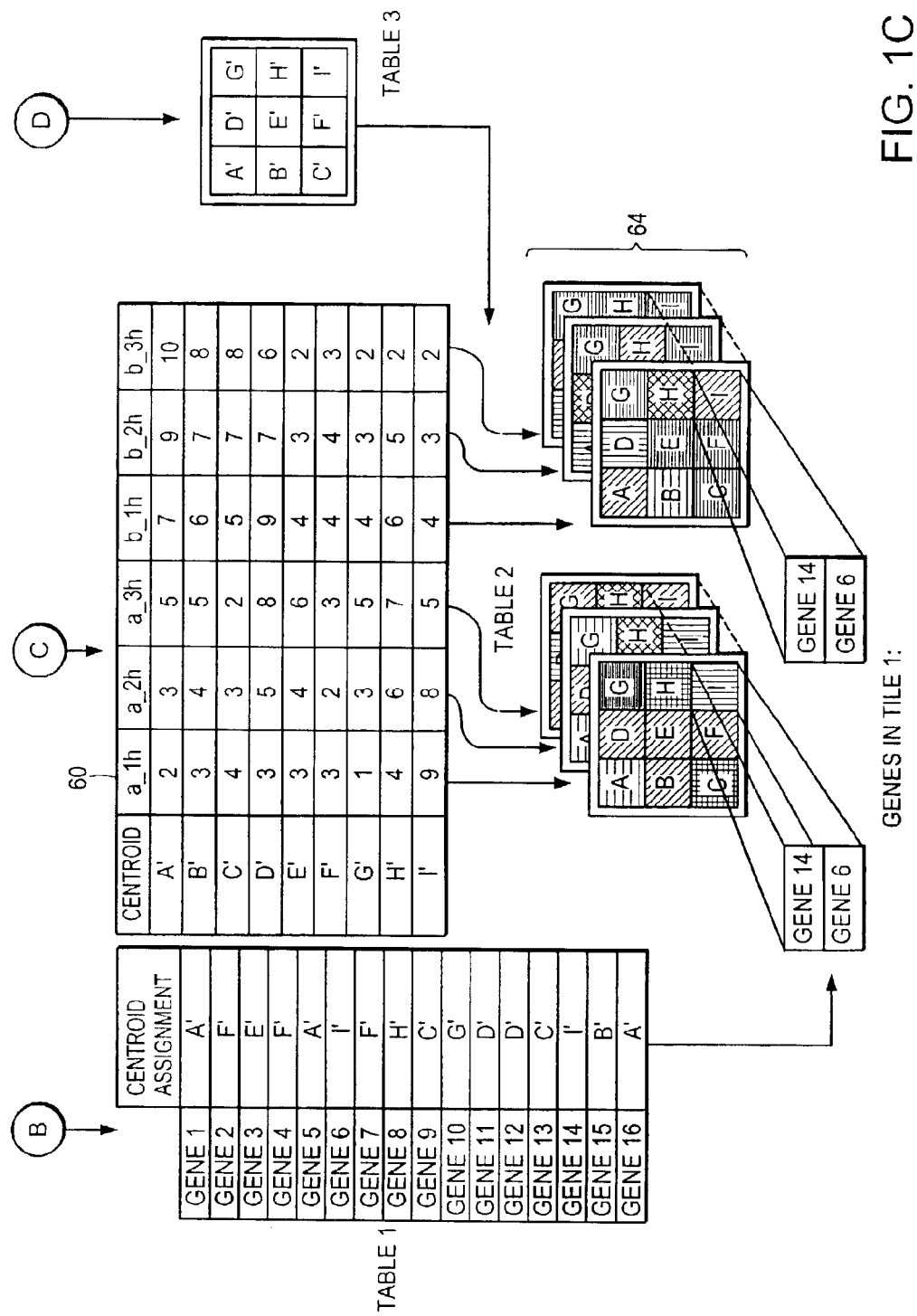
Figure 2A:
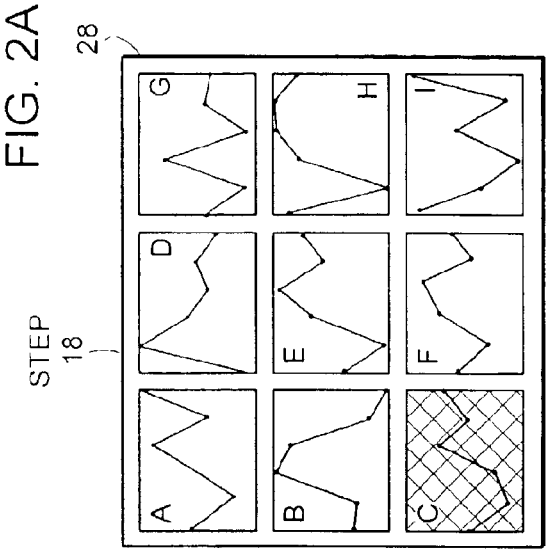
FIG. 2 is a graphic representation of an embodiment of the method used to generate the self organizing map of FIG. 1.
Figure 2A:
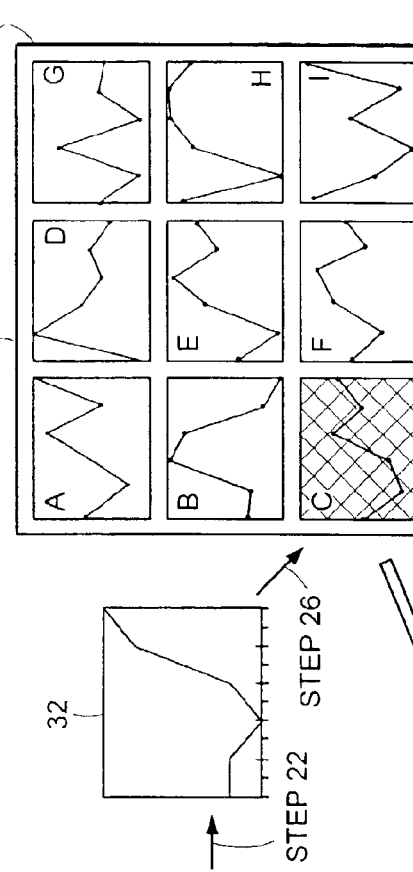
Figure 2A:
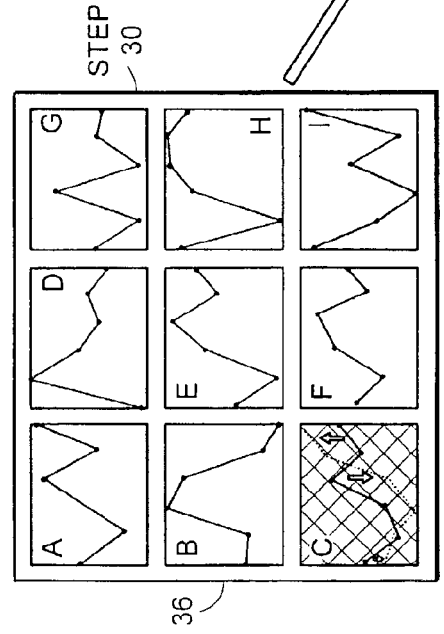
Figure 2B:
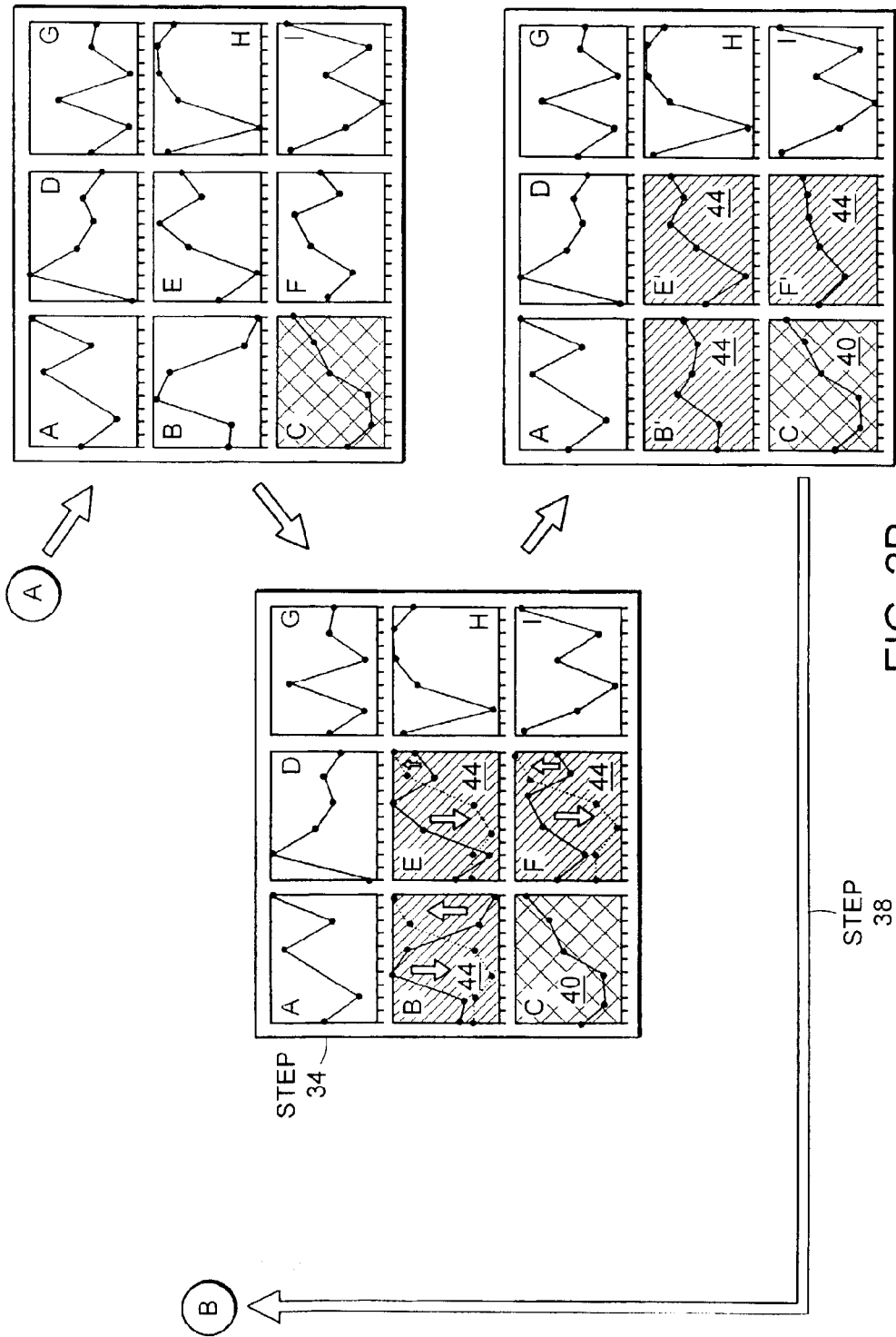

Referring to FIG. 1, for the purpose of simplifying the explanation, the method of the invention is herein described using the specific example of analyzing the expression of a large number of genes, either from a number of tissue specimens 10, in response to a variety of drugs 14 or a time course of specific drugs 16. However this is for the purpose of example only and the method can be used to display a large number of elements (in the example shown, genes) either statically or over time. For example, the information displayed could be a multitude of stocks as their prices vary with time; telephone numbers used as a function of time or any of a number of examples of systems having a large number of elements.

In FIG. 1, we assume that there are six samples, generating six gene expression profiles to be analyzed 18. In this example there are potentially three possible scenarios as to the origin of the samples and associated study question.

In the first scenario each sample represents a tissue specimen (from different patients) that will be compared (one through six) 10. No time course is involved. In the second scenario, three drugs (A, B, and C) are compared; each drug being tested on two patients. Again, no temporal monitoring is involved, only the static outcome for each drug/patient is measured 14. In the third scenario, the six samples are derived from monitoring two time courses (A and B) with three time points (1, 2 and 3 hr) each. The two time courses represent the response of a cell culture or patient to two different drugs, Drug A and Drug B. The gene expression in those tissues is examined through the use of a series of six micro-arrays.

The technique is the same regardless of the scenario that generated the samples. In the example shown the expression level of sixteen genes is examined over a period of three hours after exposure to drug A or B 16. These gene expression data are collected (step 10) within a single matrix of data 22 including all the data from all the microarrays. Importantly, even if the samples represent time courses from independent experiments or different patients, as is the case with the third example, they are entered in the same data matrix. This concatenation of data, although counterintuitive, is essential to permit the invention to function when analyzing more than one sample class. Specifically, it enables the comparison between multiple time courses with respect to the individual elements (genes) and the patterns in the profile, in response to different perturbations.

This concatenated data matrix is then used to generate (step 14) a plurality of reference centroids on a spatial layout against which the observed gene expression values (element values) are compared. In this example the reference centroids (A through I) are generated using a Self Organizing Map 26 (SOM) but any number of optimization methods that can generate centroids and place them on a layout that minimizes differences between neighboring centroids may be used. Alternative methods include, for example, energy minimization algorithms and force displacement algorithms.

Referring to FIG. 2, to use a Self Organizing Map or SOM, the SOM must be trained against the set of existing data in order to generate the spatial layout of reference centroids. This training is accomplished by initially developing a set of reference centroids. Each reference centroid contains a list M of expression values, one for each of the M samples. In FIG. 1, there are six samples, thus the reference centroid is a list that contains 6 values. Every value of the reference centroid represents the value of a single gene in one sample, and this value is referred to as an atomic value, since it is associated with one sample and one centroid. In this example, a three by three grid 28 of nine reference centroids (A–I) is first created using random numbers to generate the nine profiles (step 18). The optimal total number of reference centroids (total number of tiles per mosaic grid) can be determined empirically by the user and depends on the particular structure of the data. The grid size corresponds to the resolution of the analysis. The larger the grid (more tiles), the fewer average number of genes per tile and the finer grained the resolution. On smaller grids (fewer tiles) more genes are assigned to a tile and a 'blurry', 'pixelated' resolution will result.

In the analysis of gene expression data obtained in experiments with 10 to 100 sample microarrays, containing 1000 to 60,000 genes, the total number of reference centroids is typically 100-3000. The grid shape is preferably not a perfect square grid, in order to allow the mosaic image to orient itself properly on the mosaic. For example, for a grid with 600 centroids, one may chose a grid of 20 by 30 tiles. One method which can be used to determine the optimal grid size is to first choose a desired average number of genes assigned to each tile, J, and then to divide the total number of genes by J. J is typically within the range of 1 to 15 genes however, this number may be varied as desired.

Of the set of genes (one through sixteen) in the array 22, one gene (in this example gene nine) is randomly selected (step 22) and its time course or expression graph 32 is compared (step 26) to each of the centroids (A–I) of the set of reference centroids 28 until the best matching unit centroid (BMUC) is found (in this example reference centroid C). Which reference centroid is the best matching unit centroid or BMUC may be determined by any number of means including the minimum Euclidean distance between the gene expression graph and the reference centroid. Other measures of the best fit may include the Pearson Correlation between the gene expression graph 32 and the reference centroid graph (C); the use of common sets or the angular distance, to name but a few.

Once the BMUC is found the BMUC is adjusted (step 30) to bring it closer to the shape of the gene expression graph 32. The BMUC 36 is not adjusted to exactly match the gene expression graph but instead to be closer to it by a certain amount (referred to as the strength of the adjustment). In the example shown, the first adjustment 36 is made to bring the BMUC to within eighty percent of the difference between the BMUC and the gene expression graph 32. The resulting graph is an adjusted BMUC C' 40 which looks more similar to the gene expression graph 32. Next the neighboring reference centroids (B, E and F) 44 are also adjusted (step 34) to match the gene expression graph albeit to a lesser strength of adjustment (in this example sixty percent). The resulting adjusted neighboring centroids are B', E' and F' 44'.

Although only nine centroids (A–I) are shown in this example, in an actual application potentially thousands of cells would appear in the array. The distance from the cell of interest, in this case (C'), to the cells in the neighborhood being adjusted, in this case B, E, F, is termed the radius and the distance to the furthest cells being adjusted is the boundary radius. In the example shown here the boundary radius is one, but in an actual case it would extend out to many cells. The radius will affect the patterns generated. A larger radius will create a more rigid map, i.e. large variations in activation of neighboring tiles will not be correctly displayed by the output mosaic. A radius which is too small will fail to create visually coherent mosaics and clearly defined neighborhoods of similarly behaving genes. The user must find an appropriate value in between these two extremes. Typically, the initial radius is set to 30% of the map's smallest dimension. Therefore, a map which is 45 by 50 will have a radius of roughly 14.

The strength of adjustment for each cell up to the boundary radius varies as a function of the radius value. The strength of adjustment function may be linearly decreasing with increasing radius or may take on some other function, set as exponentially decreasing.

In this example, the only neighboring centroids adjusted are immediately adjacent to the BMUC. So in the example shown the radial distance is one and the strength of adjustment is sixty percent. Again, in a real experimental situation, as the radial distance is extended further from the BMUC, the strength of adjustment would be decreased. So for example at a radial distance of two the strength might be only forty percent and at a radial distance of three the strength might be only thirty percent and so on.

Figure 3:
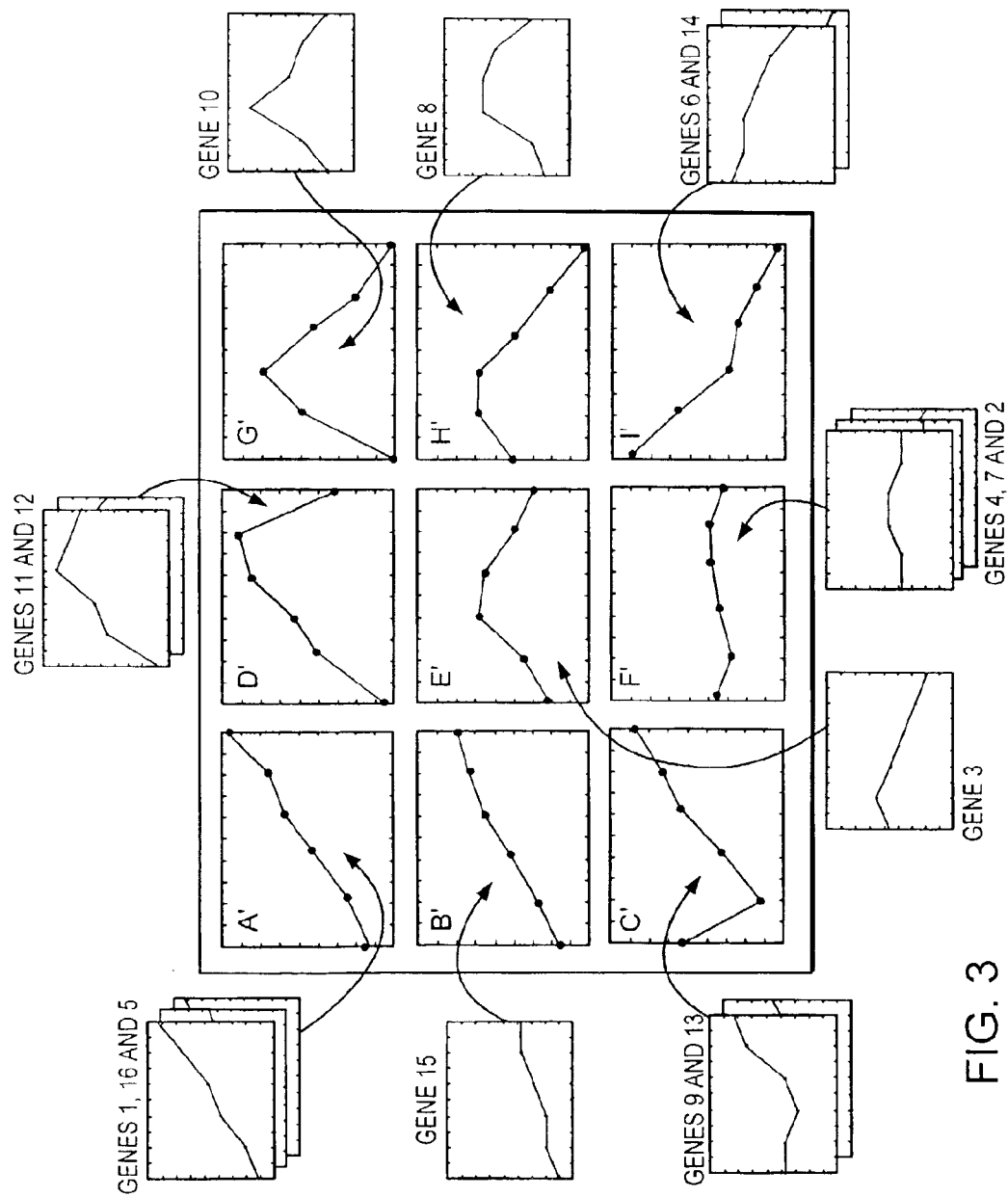
FIG. 3 is a graphic representation of the matching of gene profiles to the self organizing map of FIG. 2.

Next another gene is randomly chosen (step 38) and the above described steps repeated. This iteration occurs many times using all the genes in the set over and over again. At each iteration the strength of adjustment for a given radius from each BMUC is decreased. Thus, in the example shown, at a radius of 1 the strength of adjustment was 80%, for the first iteration from the first BMUC and would be reduced for a subsequent BMUC to, for example, 78%, at a radius of one. Thus the strength of adjustment is decreased over and over again allowing the profile in each of the cells to converge to a final value. In this example the process is iterated 10,000 times. Once all the iterations have taken place, the SOM is considered to be trained. Once the SOM has been trained the result is a set of adjusted reference centroids (A'–I') (FIG. 3). Because of the rapid convergence in the SOM algorithms, it is usually sufficient to run the SOM for a number of iterations equal to ten times the total number of genes in the input data matrix. Convergence is tested by increasing the number of iterations. Convergence is achieved when increasing the number of iterations does not significantly change the output mosaic patterns based on visual inspection.

Referring now to FIG. 3, at this point each of the genes (one through sixteen) are compared against each of the adjusted reference centroids (A'–I') and grouped according to their best fit to one of the adjusted reference centroids (A'–I'), similar to as was done during the generation of the adjusted reference centroids (A'–I'). In the example shown, genes one, five and sixteen cluster in adjusted reference centroid A'; genes two, four and seven cluster in adjusted reference centroid F' and so on. In some cases, the adjusted reference centroid, for example adjusted reference centroid E', will have only one gene in the cluster (in this example gene three). At this point in the process all the genes are assigned to an adjusted reference centroid and listed in a gene assignment list (Table 1). In addition a correspondence table (Table 2) contains the expression values corresponding to each of the adjusted reference centroids at each point in time. The array of adjusted reference centroids is called a mosaic and the location of each centroid in the mosaic is a tile.

However, since each adjusted reference centroid is a vector containing the centroid expression values of the assigned genes in all the samples (in the example of FIG. 1 there are six samples), it cannot be easily visualized. Thus, the invention requires that each adjusted reference centroid is split back into its atomic values as described above reflecting the value of the assigned genes in each of the samples. The atomic values representing the same sample X in all the adjusted reference centroids thus can be assigned to the tiles. The tiles with associated atomic values then form the mosaic that represents that sample X. (FIG. 1, Table 2 and Table 3) By repeating the procedure for each sample, one obtains one mosaic for each sample 64

It is important to remember that genes having similar expression profiles are grouped together in an adjusted reference centroid tile and will have expression profiles similar to but not necessarily identical to the profile of the adjusted reference centroid at each point in time, as shown for example by gene 8 being matched to tile H'.

It is possible to display the values in the adjusted reference centroids or tiles at each point in time in several ways. In one embodiment, each value or range of values may be assigned a color, representing an atomic value of the tile. For example the value three in the example shown can be assigned the color blue; the value four can be assigned the color green and so on. As a result, in this example, for values corresponding to the first hour of drug A 60, (listed in Table 2) adjusted reference centroids B', D', E' and F' which have a value of 3 will be colored green, while adjusted reference centroids C' and H' which have a value of 4 will be colored yellow.

Similarly, for values corresponding to the second hour of drug A, adjusted reference centroids A', C' and G', which now have a value of 3, will be colored green while adjusted reference centroids B' and E', which now have a value of 4, will be colored yellow. By displaying the values of the adjusted reference centroids at each point in time (drug A one hour, drug B two hours etc.) on the centroid location map (Table 3) the result is a series of centroid maps 64, each corresponding to a different time value. If these maps are displayed sequentially a motion graphic is generated which shows the centroids changing color with time as the centroid value changes.

In this example, the tile of the mosaic represent atomic gene expression values, i.e. each mosaic is one time point taken from a time course consisting of many time points. The tiles however can represent anything which is, or can be represented by, a single numeric value. For example, one may wish to display information about the tiles and the number of genes assigned to them, rather than just the expression level of the tile.

Although this example has been described with various colors corresponding to various values of the reference centroids, other display methods are possible. For example various symbols can be used to denote various values instead of color. Alternatively if a 3-D graph is used, the height of the block representing each tile can represent a given value. It is also possible to have tones represent the various centroids, such that by placing a cursor over the centroid of interest, the tones generated over time will be indicative of the changes to the values of the centroid over time. In general the means for displaying the results are limited only by the imagination of the designer.

Further, although each gene profile in this example is matched to the adjusted reference centroid based upon the corresponding profile of the centroid, what can be displayed as a result of this match is not so limited. Thus, in this example, although gene expression values were used to train the reference centroids and match the genes to the reference centroids, any property of the gene or of the centroid can be then displayed. So in this example, once the genes have been mapped to the tiles, other attributes of the genes can be displayed that were not used in developing the spatial layout of the matrix.

For example, one can display the number of genes assigned to each centroid to produce a density map. Gene attributes that can be mapped onto the tile, in addition to the expression level, include but are not limited to: membership to certain gene function classes (gene ontology), to promoter sequence clusters, phenoclusters, the expression level of the protein encoded by the corresponding gene, or parameters from its position in the interactome, such as connectance or centrality.

Figure 4:
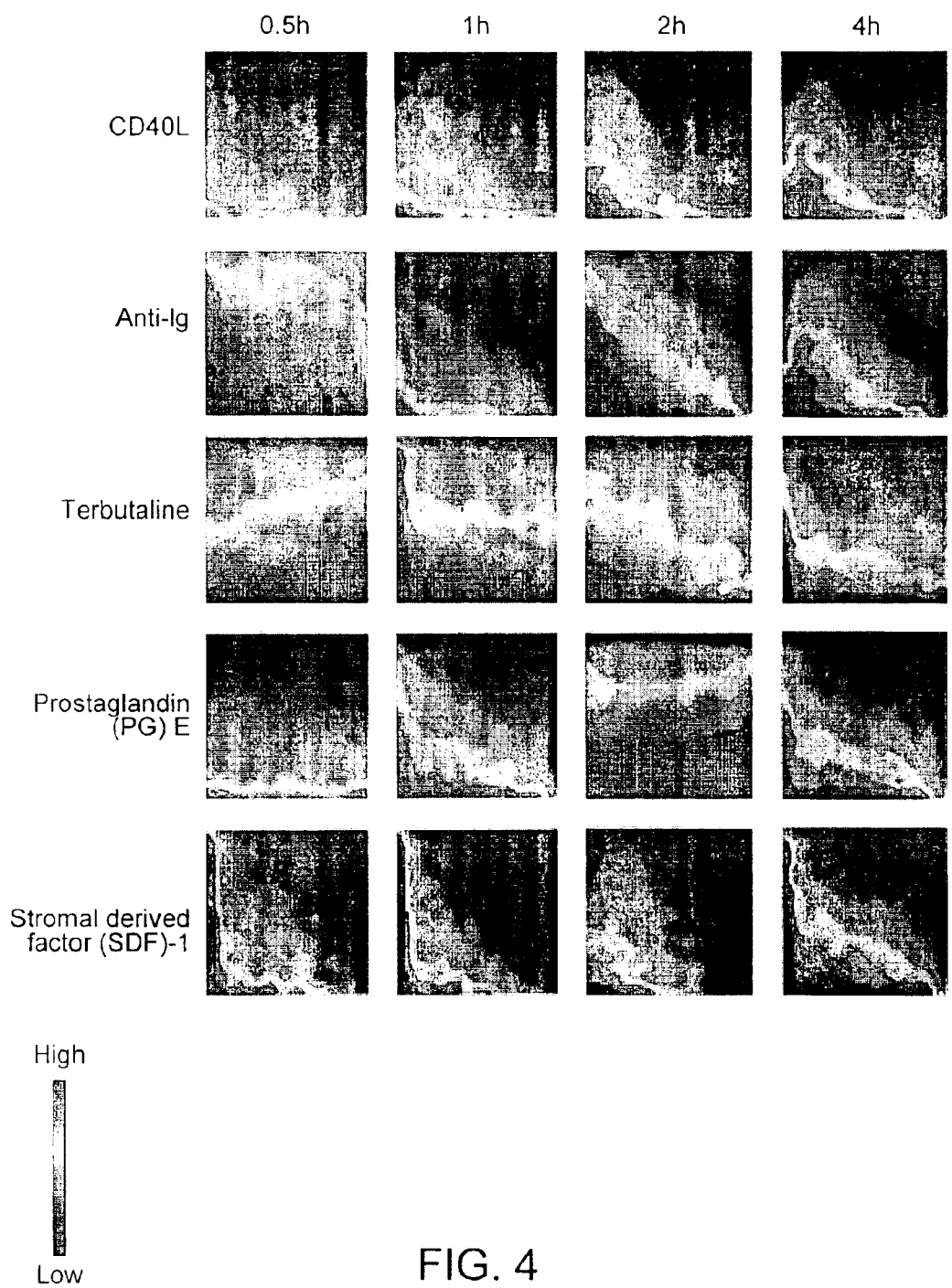
FIG. 4 is a graphic representation of the results of an embodiment of the invention used to observe gene expression as a function of time and drug exposure.

FIG. 4 is an example of the result of the method used to display the time course of gene activation in living cells exposed to various drugs or molecules, including CD40L, Anti-Ig, Terbutaline, Prostaglandin (PG) E, and Stromal derived factor (SDF)-1. In this case, about 13,000 genes were clustered into a rectangular mosaic grid with 2256 tiles comprised of 47 columns by 48 rows. It is immediately visible, even without quantitative analysis that similar patterns of gene expression profiles are activated after 4 hrs exposure to CD40L and Anti-Ig on the one hand, and to Terbutaline, SDF-1, and PGE on the other, indicating two distinct types of molecular mechanism that are utilized by these chemical agents. Note that the second group of ligands are known to similarly activate G-protein coupled receptors and hence, in fact do share a common molecular mechanism of action.

Figure 5:
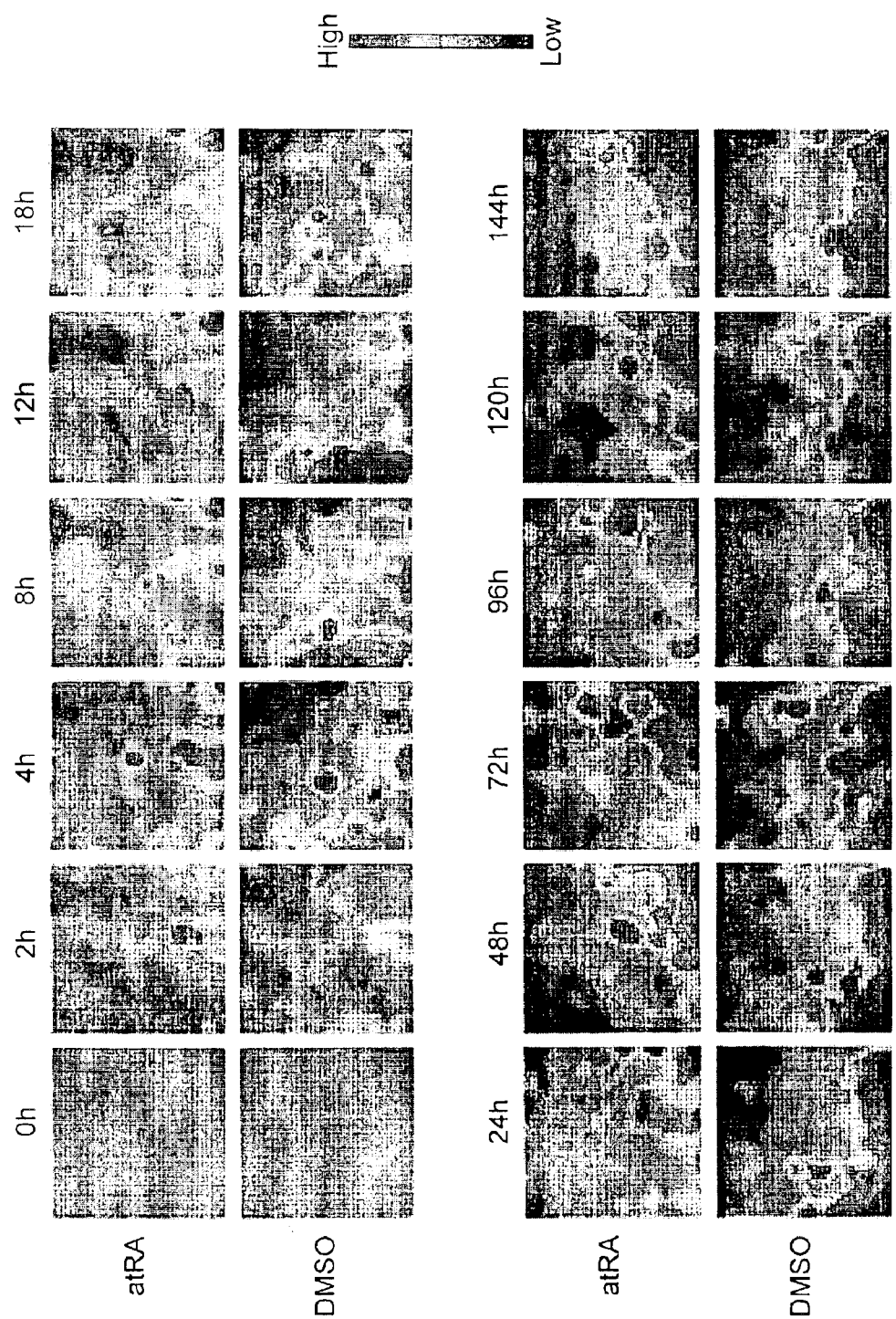
FIG. 5 is a graphic representation of the results of an embodiment of the invention used to observe gene expression as a function of time and drug exposure that displays a change in cell fate from a proliferative promyelocytic precursor cell to a differentiated neutrophil.

By analyzing how gene expression profiles change over time, it is also possible to identify major shifts in the "state-space" (a high dimensional space in which each gene represents a dimension) that may be indicative of attractor switches (a translocation of the gene expression in state space from one stable region to another mutually exclusive region) within the network. This would correspond to a significant all-or-none change in the functional activity of the entire network, as occurs during major changes in cell phenotype or fate, including switches between growth, apoptosis, and differentiation. For example, FIG. 5 shows two parallel time courses of HL60 cells treated with two distinct drugs, DMSO and ATRA. Both of these agents are known to cause terminal differentiation of HL60 cells into neutrophils. Major changes of both mosaics at 18–24 hr indicate a shift in state space, possibly associated with an attractor switch. This state space shift is quite distinct in the two processes, as evidenced by the disparate mosaic patterns at this time point. However, subsequent mosaics (48h–144h) suggest that the responses converge in state space, since the overall mosaic patterns become more similar again. This indicates that the terminal differentiated state is an attractor state of the regulatory gene network. This signature of an attractor switch at 18–24 hr may be used to screen for chemical agents that produce distinct phenotypic responses without having to wait until the end of the entire process.

Figure 6A:
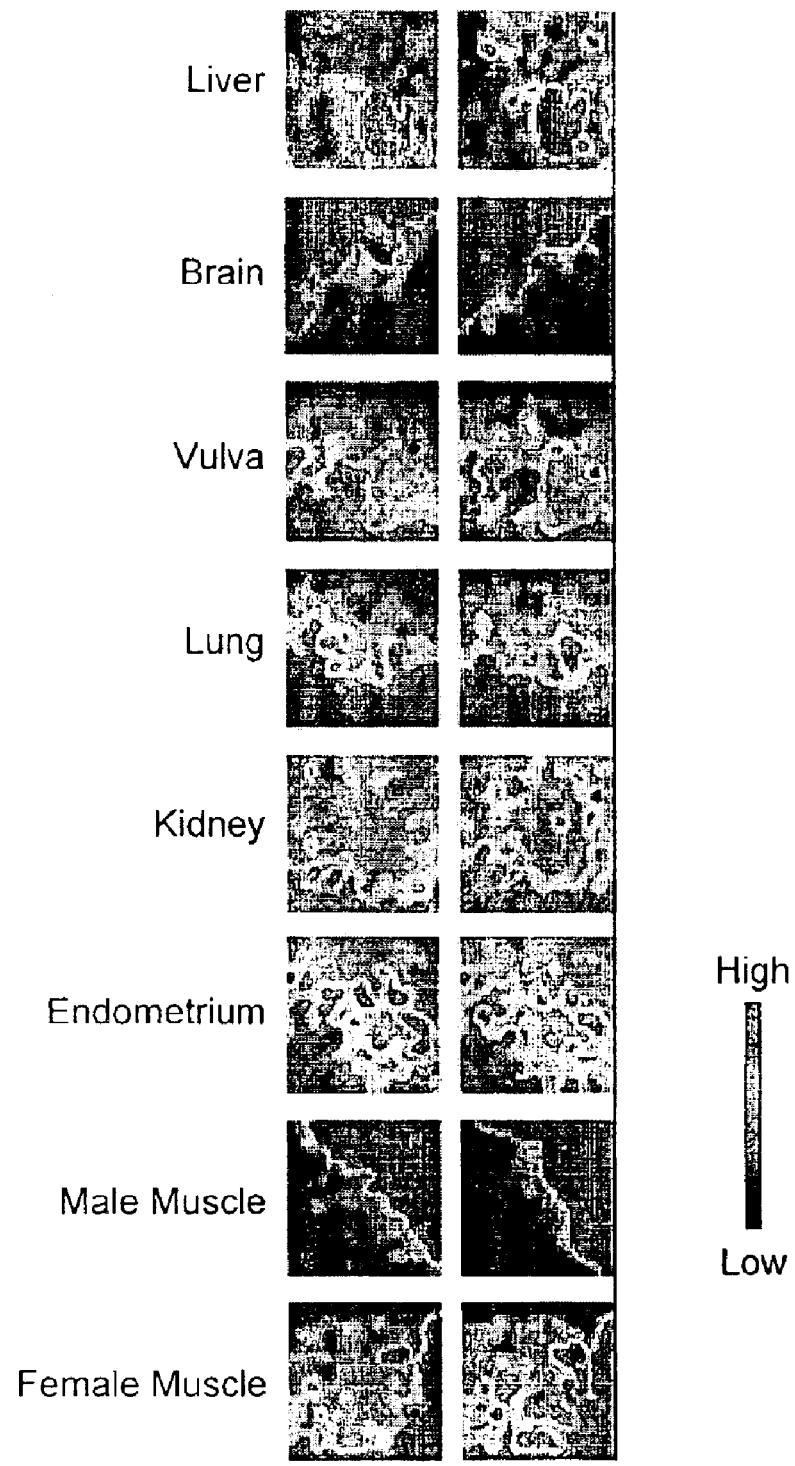
FIG. 6a is a series of mosaic representations, as produced by an embodiment of the invention, of gene expression in various normal human tissue types from sixteen different subjects.

It is also possible to compare gene expression profiles from similar tissues taken from various individuals to visualize which genes are characteristically activated in the same tissue types and hence provide a diagnostic read-out of tissue type. In FIG. 6a, gene expression profiles of about 7000 genes were generated for samples of various normal human tissues from two donors per tissue type and the resulting gene expression data graphically displayed according to the teachings of the invention. As can be readily seen, the graphic representations of the tissue type from both individuals are similar for the same tissue type but are different between tissue types. This indicates that the graphic display as produced by the invention can be used to automatically determine tissue type from gene expression information.

Figure 6B:
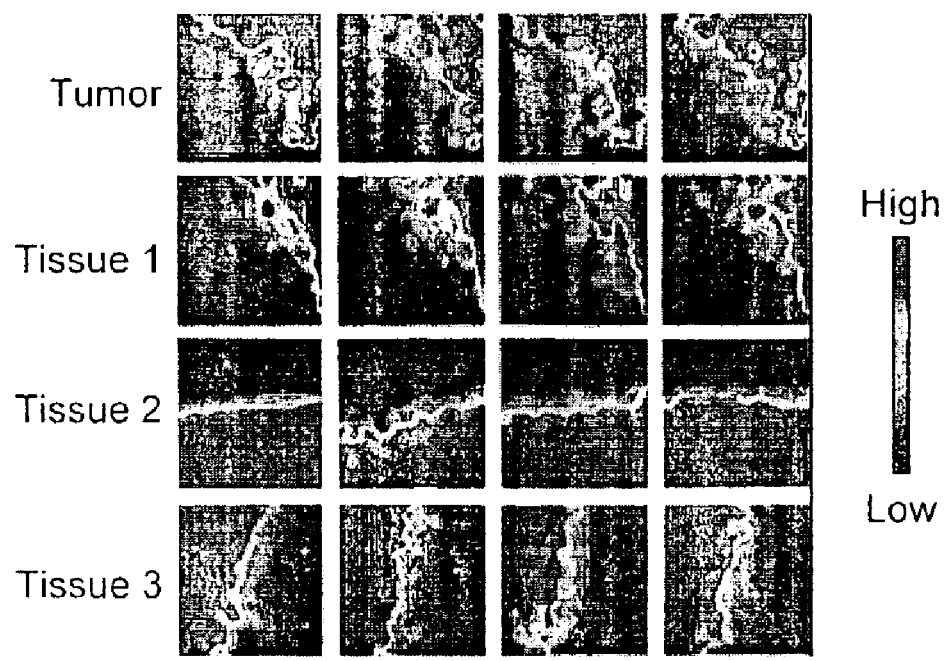
FIG. 6b is a series of mosaic representations, as produced by an embodiment of the invention, of gene expression in various human tissue types obtained from sixteen subjects.

The visualization of tissue data can also be used to diagnose diseased tissues. For example gene expression profiles may be obtained from tumor of the same organ in different individuals. These profiles may be compared to identify a tumor-specific gene profile pattern, and to determine from which tissues the tumors arose by comparing their gene expression patterns with profiles from various normal tissue types. In FIG. 6b, gene expression levels of 12626 genes were visualized using the present technology in a human tumor and 3 different types of normal tissues (1, 2, and 3) that were obtained from sixteen individuals. Note first that the gene expression patterns within each group of the three tissue types and the tumor are similar. As can be seen, tissue type 1 has a triangular pattern of expression extending from the upper left to the lower right and upper right corners of the grid. Tissue type 2 has substantially a horizontal pattern of expression. Tissue type 3 has an expression pattern which is substantially a vertical pattern of expression. When the expression patterns for the tumors are compared with these three tissue types, it is seen that the tumor also has an expression pattern that extends diagonally from the upper left to the lower right. Potentially this may imply that the tumors have arisen from tissue type 1 and that the deviations in gene expression from the gene expression in tissue type 1 may be indicative of the tumor state.

Figure 6C:
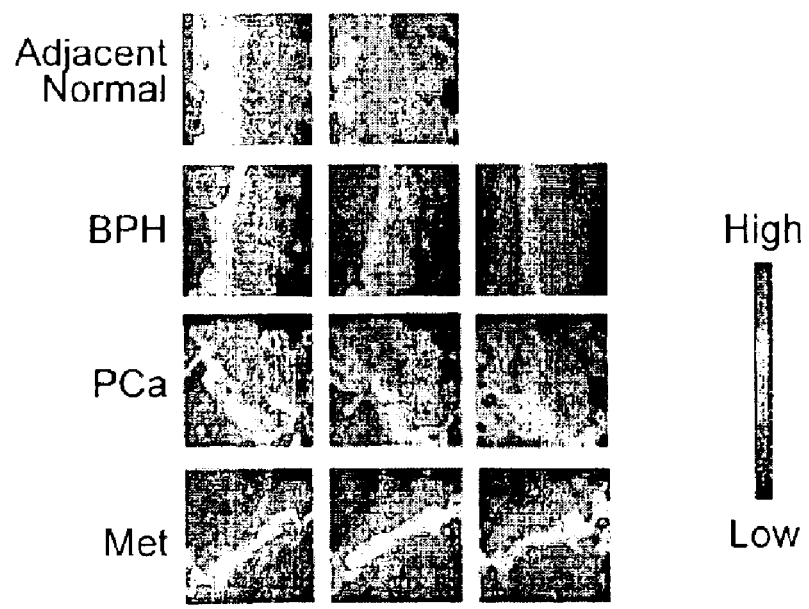
FIG. 6c is a series of mosaic representations, as produced by an embodiment of the invention, of gene expression in various prostate disease states, obtained from eleven human subjects.

In addition it is possible to classify or stage tumors according to their profile. The tumors shown in FIG. 6b are the same type of tumor as indicated by their generally similar profiles. Similarly, Tissue types 1, 2 and 3 each display patterns that are characteristic for their type. It is therefore possible to distinguish various tissues and tumors visually using this technique. In FIG. 6c, gene expression profiles of about 9000 genes were generated for samples of prostate tissue removed from a normal region of a gland that also contains a tumor, benign prostatic hyperplasial tissue, prostate cancer tissue and metastatic prostate cancer tissue. Again the resulting gene expression data graphically are displayed according to the teachings of the invention. As can be seen, the mosaic representations of the four prostate tissue types not only vary between the normal and the diseased tissues, but the patterns in the diseased tissues are signatures of the type and stage of disease. This means that the graphic representations generated by the invention can be used to provide a means for the automated diagnosis of tissue disease state. Such a diagnosis based upon the graphic representation of the invention will lead to low cost screenings of patients and rapid identification based on gene profiles without a requirement for gene identification or clustering.

The program used to perform the functions described is also capable of providing additional information to the user. So for example by clicking on a tile in the mosaic all the genes associated with that tile are listed. By selecting one of those genes, the program is able to link to other databases to provide information about the gene, gene products, disease states to name but a few.

As discussed at the beginning of this specification, the examples discussed herein are related to gene expression levels. However, the technique may be applied to other large amounts of data, for example, financial data such as in the stock market. In this embodiment individual stocks take the place of genes and the stock price of the stock takes the place of the gene expression level of the gene. The analyses would proceed as before watching groups of stocks rising and falling in value just as we saw groups of genes being turned on or off. Clusters of stocks in the same industry may be expected to rise and fall together with news affecting the entire industry. Conversely a stock which is affected because of news specific to its underlying company may be seen to deviate from the industry cluster over time.

Similarly, intelligence gathering may utilize the present invention in order to search for patterns of communication which might indicate some form of threat. For example, one could examine phone call patterns of designated individuals using the number called, duration of call, or frequency of calls as an attribute for each member of a phone network. Groups of individuals who are interacting would show clustering and the increase in call length or frequency could be related to some form of threat, just as the amount of communication or "chatter" is used by the intelligence agencies to determine potential threat levels at present. In addition, it may be possible to identify critical "nodes" from which most information flows outwards (e.g., as would be expected from leaders of a terrorist cell) and to discriminate them from receivers or followers. Most importantly, this technology can identify major shifts in the "state-space" that are indicative of attractor switches within the network; this would correspond to a significant all-or-none change in the functional activity of the entire network, as one might expect before a major terrorist incident. Note that this is distinct from the level of activity within all of the individual connections, as is currently used in information gathering.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

What is claimed is:

1. A method of displaying a set of data comprising the steps of:

forming a spatial layout of tiles each corresponding to a representative reference element in a mosaic;

mapping observed elements onto said spatial layout of tiles of representative reference elements;

assigning a respective value to each respective tile of said spatial layout of representative reference elements; and displaying an image of the spatial layout of tiles of representative reference elements, wherein each tile comprises atomic attributes of representative elements.

2. The method claim 1 wherein the step of forming said spatial layout of tiles each corresponding to said representative reference element in said mosaic comprises the steps of forming a self organizing map.

3. The method of claim 2 wherein the steps of forming a self organizing map comprise the steps of:

a.) forming representative reference elements;

b.) matching an observed element to a respective representative reference element to select a best unit matching centroid;

c.) adjusting the best unit matching centroid to form an adjusted best unit matching centroid; and d.) iterating steps b and c a plurality of times for each observed element.

4. The method of claim 3 wherein the step of matching said observed element to said representative reference element comprises the step of measuring the Euclidean distance between said observed element and each representative reference element and selecting said representative reference element having the least distance Euclidean distance.

5. The method of claim 3 wherein the step of matching said observed element to said representative reference element comprises the step of measuring the correlation between said observed element and each representative reference element and selecting said representative reference element having the highest correlation.

6. The method of claim 3 wherein the step of adjusting the best unit matching centroid comprises adjusting the value of the representative reference element to form an adjusted best unit matching centroid.

7. The method of claim 6 wherein the step of adjusting the best unit matching centroid includes the step of adjusting neighboring representative reference elements.

8. The method of claim 7 wherein the neighboring representative reference elements are included within a boundary radius describing the size of a neighborhood.

9. The method of claim 8 wherein the boundary radius decreases with iteration.

10. The method of claim 7 wherein the step of adjusting the neighboring representative reference elements comprises the step of modifying the neighboring representative reference elements by an adjustment strength which is a function of the distance from the best unit matching centroid to the neighboring representative reference element being adjusted.

11. The method of claim 10 wherein the adjustment strength decreases with iteration.

12. The method of claim 1 wherein the step of assigning said respective value to each respective tile of said spatial layout of representative reference elements comprises assigning a color to each respective tile in response to the value of the tile.

13. The method of claim 1 wherein the step of assigning the respective value to each respective tile of said spatial layout of representative reference elements comprises assigning a height to each respective tile in response to the value of the tile in a three dimension graph.

14. The method of claim 1 wherein the respective value of the respective tile is a value associated with the respective reference element.

15. The method of claim 1 wherein the step of assigning said respective value to each respective tile of said spatial layout of representative reference elements comprises assigning, to each respective tile in response to the value of the tile, a property selected from the group consisting of: symbol shape, size, hue and pitch.

16. The method of claim 1 further comprising the step of repeating the step of displaying an image of the spatial layout of tiles of representative reference elements to form a motion image.

17. The method of claim 1 further comprising the step of concatenating data comprising observed elements.

18. A method of displaying information comprising the steps of:
  a.) normalizing data of said observed elements;
  b.) generating reference centroids;
  c.) generating a map of said reference centroids;
  d.) matching an observed element to a respective reference centroid;
  e.) adjusting said respective reference centroid and neighboring reference centroids within a neighborhood radius;
  f.) iterating steps e and f, modifying the strength of adjustment and neighborhood radius to form a plurality of adjusted reference centroids;
  g.) matching each observed element to a respective adjusted reference centroid of said plurality of adjusted reference centroids;
  h.) assigning a respective value for each adjusted reference centroid;
  i.) assigning a respective graphic representation to each respective value; and
  j.) displaying a mosaic of each graphic representation.

19. The method of claim 18 further comprising the step of iterating step j to form a motion graphic.

20. The method of claim 18 further comprising the step of concatenating data comprising observed elements prior to normalizing the data.

21. The method of claim 18 wherein said respective graphic representation is a color representation.

22. The method of claim 18 wherein said respective graphic representation is a 3-dimensional representation.

23. The method of claim 18 wherein each value is an attribute not used to generate the reference centroid.

24. The method of claim 18 wherein each of said observed elements is a gene and wherein each value is a gene expression value.

25. The method of claim 18 wherein each of said observed elements is a stock, and wherein each value is a stock value.

26. The method of claim 18 wherein each of said observed elements is a telecommunications link and wherein each value is an active connection characterized by attributes such as duration of the connection, frequency of communications, or the link to which one connects.

27. The method of claim 18 wherein each of said observed elements is a telephone link and wherein each value is a phone call characterized by attributes such as duration of the call, frequency of calls, or the phone number to which one connects.

28. An apparatus for displaying information comprising:
  a tiler forming a spatial layout of tiles each corresponding to a representative element;
  a mapper mapping observed elements onto said spatial layout of tiles of representative elements;
  an assigner assigning a respective value to each respective tile of said spatial layout of representative elements; and
  a display displaying an image of the spatial layout of tiles of representative elements,
  wherein each tile comprises atomic attributes of representative elements.

29. The apparatus of claim 28 wherein said tiler comprises a self organizing map processor.

30. The apparatus of claim 28 wherein said assigner assigns a color to each respective tile.

31. The apparatus of claim 28 wherein said assigner assigns a height to each respective tile.

32. The apparatus of claim 28 where said display is a 3 dimensional display.

33. The apparatus of claim 28 wherein said mapper measures the Euclidean distance between observed elements and representative elements.

34. The apparatus of claim 28 wherein said mapper measures the correlation between observed elements and representative elements.

35. The apparatus of claim 28 wherein said display is a motion display.

36. An apparatus for displaying data, said apparatus comprising:
  a.) a data concatenator concatenating data comprising observed elements;
  b.) a normalizer normalizing data of said concatenated observed elements;
  c.) a reference centroid generator generating a plurality of reference centroids and a map of said reference centroids;
  d.) a comparator mapping an observed element to a respective reference centroid;
  e.) a processor iteratively adjusting said respective reference centroid and neighboring reference centroids and modifying the strength of adjustment and neighborhood radius to form a plurality of adjusted reference centroids;

f.) a mapper mapping each observed element to a respective adjusted reference centroid of said plurality of adjusted reference centroids;

g.) an value assignor assigning a respective value for each sample; and h.) a graphics engine assigning a respective graphic representation to each respective value and displaying a mosaic for each sample.

37. A method of determining an attribute of a tissue comprising:

forming a spatial layout of tiles each corresponding to a representative reference element in a mosaic;

mapping observed elements of said tissue onto said spatial layout of tiles of representative reference elements;

assigning a respective value to each respective tile of said spatial layout of representative reference elements; and displaying an image of the spatial layout of tiles of representative reference elements, wherein each tile comprises atomic attributes of representative elements.

* * * * *

UNITED STATES PATENT AND TRADEMARK OFFICE
CERTIFICATE OF CORRECTION

PATENT NO. : 6,888,543 B2  Page 1 of 1
DATED : May 3, 2005
INVENTOR(S) : Ingber et al.

It is certified that error appears in the above-identified patent and that said Letters Patent is hereby corrected as shown below:

Column 1,
Line 16, the following should be inserted:
-- GOVERNMENT RIGHTS
This invention was made with U.S. Government support under Grant F49620-01-01-0564 awarded by the U.S. Air Force Office of Scientific Research; Cooperative Agreement NAG2-1501 awarded by the Ames Research Center of the National Aeronautics and Space Administration (NASA); and Grant CA 55833-09 awarded by the National Institute of Health (NIH). The government may have certain rights in the invention. --.

Signed and Sealed this

Eighth Day of November, 2005

JON W. DUDAS
*Director of the United States Patent and Trademark Office*